United States Patent
Fujii et al.

(10) Patent No.: US 9,200,684 B2
(45) Date of Patent: Dec. 1, 2015

(54) ELECTROMAGNETIC CLUTCH UNIT, FOUR-WHEEL-DRIVE VEHICLE, CONTROL METHOD FOR THE ELECTROMAGNETIC CLUTCH UNIT, AND CONTROL METHOD FOR THE FOUR-WHEEL-DRIVE VEHICLE

(71) Applicant: JTEKT Corporation, Osaka-shi (JP)

(72) Inventors: Noriyuki Fujii, Hekinan (JP); Kunihiko Suzuki, Gamagori (JP)

(73) Assignee: JTEKT CORPORATION, Osaka-shi (JP)

( * ) Notice: Subject to any disclaimer, the term of this patent is extended or adjusted under 35 U.S.C. 154(b) by 98 days.

(21) Appl. No.: 14/204,502

(22) Filed: Mar. 11, 2014

(65) Prior Publication Data

US 2014/0274543 A1 Sep. 18, 2014

(30) Foreign Application Priority Data

Mar. 14, 2013 (JP) ................................. 2013-051937

(51) Int. Cl.

| F16D 27/04 | (2006.01) |
|---|---|
| F16D 27/06 | (2006.01) |
| F16D 27/112 | (2006.01) |
| F16D 27/118 | (2006.01) |
| F16H 48/22 | (2006.01) |
| F16D 11/00 | (2006.01) |
| F16D 27/00 | (2006.01) |

(52) U.S. Cl.

CPC ................. *F16D 27/04* (2013.01); *F16D 27/06* (2013.01); *F16H 48/22* (2013.01); *F16D 27/112* (2013.01); *F16D 27/118* (2013.01); *F16D 2011/002* (2013.01); *F16D 2027/008* (2013.01); *F16D 2500/10431* (2013.01)

(58) Field of Classification Search

USPC ......................................................... 192/53.2
See application file for complete search history.

(56) References Cited

U.S. PATENT DOCUMENTS

| 4,561,520 A | * | 12/1985 | Fogelberg ...................... 180/247 |
| 5,052,534 A | * | 10/1991 | Gustin et al. ................. 192/53.2 |
| 2013/0056321 A1 | | 3/2013 | Fujii et al. |

FOREIGN PATENT DOCUMENTS

| DE | 10 2007 058 552 A1 | 6/2009 |
| EP | 2 565 483 A2 | 3/2013 |
| JP | 2004-9954 | 1/2004 |

OTHER PUBLICATIONS

Extended European Search Report issued on Jul. 28, 2014 in the corresponding European Application No. 14159016.6.

* cited by examiner

*Primary Examiner* — Colby M Hansen
(74) *Attorney, Agent, or Firm* — Oblon, McClelland, Maier & Neustadt, L.L.P.

(57) ABSTRACT

An electromagnetic clutch unit includes: a friction mechanism including a first friction member and a second friction member; a lock sleeve connected to an input shaft member so as to be non-rotatable relative to the input shaft member, and movable in an axial direction of the electromagnetic clutch unit between a first position at which the lock sleeve is engaged with only the input shaft member and a second position at which the lock sleeve is engaged with both an output shaft member and the input shaft member; and a pressing member that constitutes a magnetic path extending over the pressing member and the second friction member, and that presses the lock sleeve with the electromagnetic force to move the lock sleeve from the first position to the second position.

20 Claims, 8 Drawing Sheets

ELECTROMAGNETIC CLUTCH UNIT, FOUR-WHEEL-DRIVE VEHICLE, CONTROL METHOD FOR THE ELECTROMAGNETIC CLUTCH UNIT, AND CONTROL METHOD FOR THE FOUR-WHEEL-DRIVE VEHICLE

INCORPORATION BY REFERENCE

The disclosure of Japanese Patent Application No. 2013-051937 filed on Mar. 14, 2013, including the specification, drawings and abstract, is incorporated herein by reference in its entirety.

BACKGROUND OF THE INVENTION

1. Field of the Invention

The invention relates to an electromagnetic clutch unit that connects a pair of rotary members, which are rotatable relative to each other, to each other such that torque is transmitted therebetween, a four-wheel-drive vehicle, a control method for the electromagnetic clutch unit, and a control method for the four-wheel-drive vehicle.

2. Description of Related Art

There has been a four-wheel-drive vehicle configured such that driving force generated by an engine, which serves as a drive source, is constantly transmitted to front wheels and the driving force generated by the engine is transmitted to rear wheels depending on a travelling state. Conventionally, in such a four-wheel-drive vehicle, a clutch is disposed on the front wheel side of a propeller shaft that transmits the driving force in the longitudinal direction of the vehicle, and another clutch is disposed on the rear wheel side of the propeller shaft (refer to, for example, Japanese Patent Application Publication No. 2004-9954 (JP 2004-9954 A)).

In the four-wheel-drive vehicle described in JP 2004-9954 A, a dog clutch is disposed on the front wheel side of the propeller shaft and a multiple-disc clutch, which transmits the driving force by friction, is disposed on the rear wheel side of the propeller shaft. In the two-wheel-drive mode in which the driving force is transmitted only to the front wheels, transmission of the driving force by the dog clutch and transmission of the driving force by the multiple-disc clutch are both interrupted to stop the rotation of the propeller shaft. Thus, it is possible to reduce the sliding resistance caused by the rotation of the propeller shaft and the stirring resistance of a lubricant caused by a gear connected to the propeller shaft. This leads to a reduction in the specific fuel consumption.

If the rotation of an input-side rotary shaft and the rotation of an output-side rotary shaft are not synchronized with each other, the dog clutch is not able to connect the two rotary shafts to each other such that driving force can be transmitted therebetween. In the four-wheel-drive vehicle described in Japanese Patent Application Publication No. 2004-9954 (JP 2004-9954 A), a control system is configured such that, in order to switch the drive mode from the two-wheel-drive mode to the four-wheel-drive mode, first, the torque of rear wheels generated while the vehicle is travelling is transmitted to the propeller shaft by the multiple-disc clutch to rotate the propeller shaft, the rotations of the two rotary shafts of the dog clutch are synchronized with each other in advance, and then the dog clutch is actuated.

However, for example, in a case where the vehicle is making a turn in the two-wheel-drive mode or a slip occurs in a wheel in the two-wheel-drive mode, a difference is caused in rotational speed between the front wheels and the rear wheels. Therefore, even if the propeller shaft is rotated by actuating the multiple-disc clutch on the rear wheel side, it is not possible to synchronize the rotations of the two rotary shafts of the dog clutch with each other. As a result, when the drive mode should be switched to the four-wheel-drive mode in which the driving force generated by the engine is transmitted also to the rear wheels, there is a possibility that the dog clutch will not be actuated and consequently the drive mode will not be switched to the four-wheel-drive mode.

SUMMARY OF THE INVENTION

One object of the invention is to provide an electromagnetic clutch unit configured such that, even if the rotations of a first rotary member and a second rotary member, which are to be connected to each other such that torque is transmitted therebetween, are not synchronized with each other, the rotations of the rotary members are allowed to be synchronized with each other and the rotary members are connected to each other through engagement, and a four-wheel-drive vehicle including the electromagnetic clutch unit.

An aspect of the invention relates to an electromagnetic clutch unit configured to connect a first rotary member and a second rotary member, which are rotatable relative to each other, such that torque is transmitted between the first rotary member and the second rotary member. The electromagnetic clutch unit includes: an electromagnetic coil that generates electromagnetic force upon energization of the electromagnetic coil; a friction mechanism including a first friction member connected to the first rotary member so as to be non-rotatable relative to the first rotary member, and a second friction member connected to the second rotary member so as to be non-rotatable relative to the second rotary member and frictionally engageable with the first friction member by the electromagnetic force; a lock sleeve connected to the second rotary member so as to be non-rotatable relative to the second rotary member, and movable in an axial direction of the electromagnetic clutch unit between a first position at which the lock sleeve is engaged with the second rotary member but is not engaged with the first rotary member and a second position at which the lock sleeve is engaged with both the first rotary member and the second rotary member; and a pressing member that constitutes a magnetic path extending over the pressing member and the second friction member, and that presses the lock sleeve with the electromagnetic force to move the lock sleeve from the first position to the second position.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, an electromagnetic clutch unit according to an embodiment of the invention and a four-wheel-drive vehicle including the electromagnetic clutch unit will be described in detail with reference to the accompanying drawings.

Figure 1:
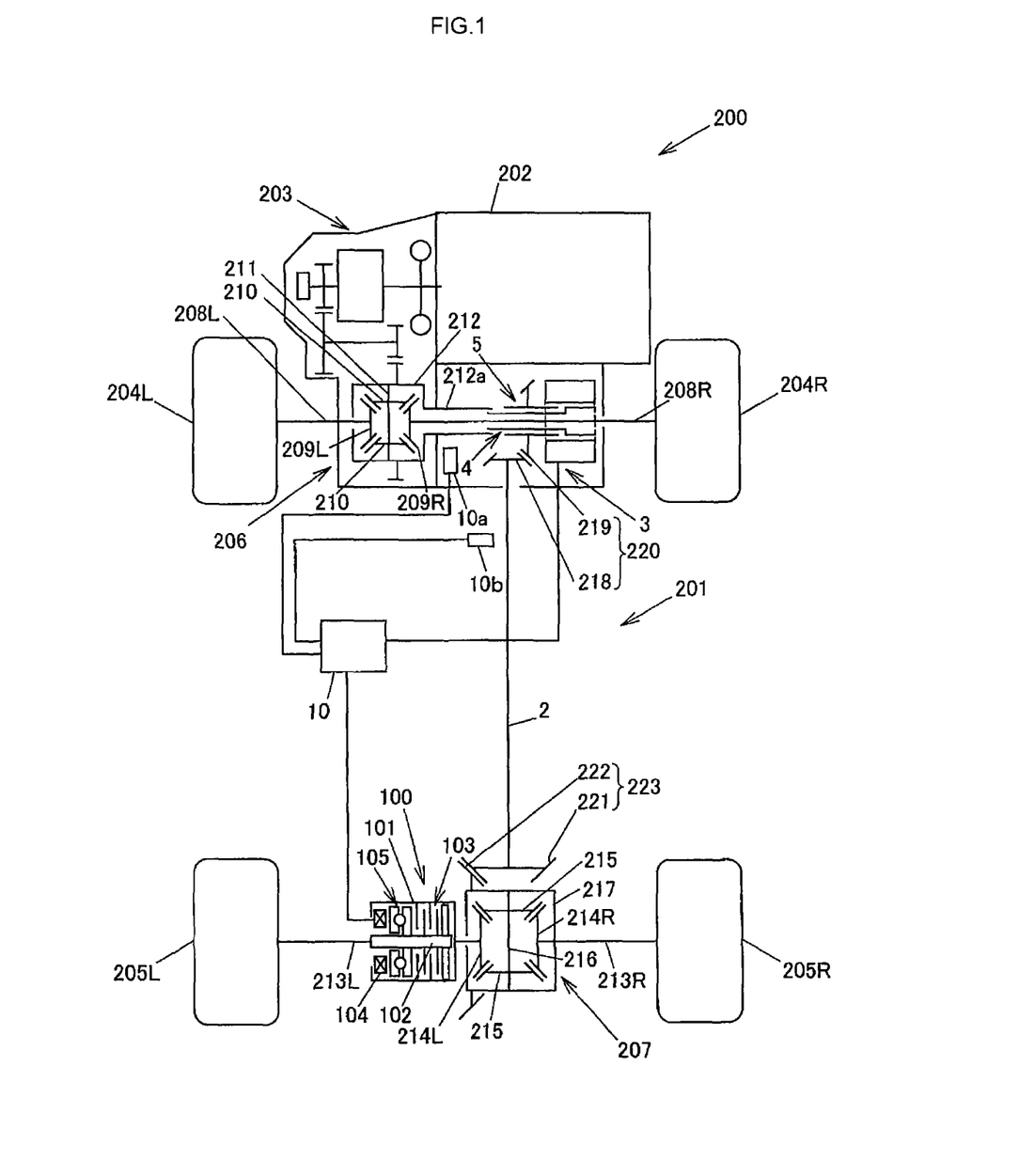
FIG. 1 is a schematic configuration diagram of a four-wheel-drive vehicle including an electromagnetic clutch unit according to an embodiment of the invention.

FIG. 1 is a schematic configuration diagram of a four-wheel-drive vehicle 200 including an electromagnetic clutch unit 3 according to an embodiment of the invention. The four-wheel-drive vehicle 200 has a driving force transmission system 201, an engine 202, which serves as a drive source, a transmission 203, front wheels 204R, 204L, which serve as main drive wheels, and rear wheels 205R, 205L, which serve as auxiliary drive wheels. In each drawing, a character "R" in a reference symbol signifies the right side with respect to the travelling direction of the four-wheel-drive vehicle 200, whereas a character "L" in a reference symbol signifies the left side with respect to the travelling direction of the four-wheel-drive vehicle 200.

The driving force transmission system 201 is disposed, together with a front differential 206 and a rear differential 207, on a driving force transmission path extending from the transmission 203 to the front wheels 204R, 204L and the rear wheels 205R, 205L in the four-wheel-drive vehicle 200. The driving force transmission system 201 includes a propeller shaft 2, the electromagnetic clutch unit 3, and a torque coupling 100. The propeller shaft 2 is a driving force transmission shaft that transmits driving force (torque) generated by the engine 202 from the front wheels 204R, 204L side toward the rear wheels 205R, 205L. The electromagnetic clutch unit 3 is disposed at such a position that transmission of the driving force can be interrupted at a position upstream of the propeller shaft 2 in the driving force transmission path. The torque coupling 100 is disposed at such a position that transmission of the driving force from the propeller shaft 2 toward the rear wheels 205R, 205L can be interrupted.

The electromagnetic clutch unit 3 and the torque coupling 100 are controlled by an electronic control unit (ECU) 10, which serves as a controller. A first rotation sensor 10a that detects a rotational speed of a front differential case 212 and a second rotation sensor 10b that detects a rotational speed of the propeller shaft 2 are connected to the ECU 10.

The driving force generated by the engine 202 is constantly transmitted to the front wheels 204R, 204L via the transmission 203 and the front differential 206. The driving force generated by the engine 202 is transmitted to the rear wheels 205R, 205L via the transmission 203, the electromagnetic clutch unit 3, the propeller shaft 2, the rear differential 207, and the torque coupling 100, depending on the travelling state of the four-wheel-drive vehicle 200. The ECU 10 controls the electromagnetic clutch unit 3 and the torque coupling 100 based on the travelling state such as the difference in rotational speed between the front wheels 204R, 204L and the rear wheels 205R, 205L and the amount of acceleration operation performed by a driver with the use of an accelerator pedal.

The front differential 206 includes right and left side gears 209R, 209L, a pair of pinion gears 210, a pinion shaft 211, and the front differential case 212. The pinion gears 210 are rotatably supported by the pinion shaft 211. The front differential case 212 supports the pinion shaft 211. The driving force output from the transmission 203 is directly transmitted by meshed gears to the front differential case 212.

The side gear 209L is connected to the left front wheel 204L via a front wheel-side axle shaft 208L. The side gear 209R is connected to the right front wheel 204R via a front wheel-side axle shaft 208R. The pinion gears 210 mesh with the side gears 209R, 209L with gear axes being orthogonal to the gear axes of the side gears 209R, 209L. The front differential case 212 has a tubular portion 212a that extends along the axle shaft 208R.

The rear differential 207 includes right and left side gears 214R, 214L, a pair of pinion gears 215, a pinion shaft 216, and a rear differential case 217. The pinion gears 215 are rotatably supported by the pinion shaft 216. The rear differential case 217 supports the pinion shaft 216. The side gear 214L is connected to the left rear wheel 205L via the torque coupling 100 and a rear wheel-side axle shaft 213L. The side gear 214R is connected to the right rear wheel 205R via a rear wheel-side axle shaft 213R.

At the front wheel-side end of the propeller shaft 2, there is disposed a front wheel-side bevel gear mechanism 220 formed of a drive pinion 218 and a ring gear 219 that mesh with each other. The drive pinion 218 rotates together with the propeller shaft 2. The ring gear 219 is fixed to an output shaft member 5 (described later) of the electromagnetic clutch unit 3. At the rear wheel-side end of the propeller shaft 2, there is disposed a bevel gear mechanism 223 formed of a drive pinion 221 and a ring gear 222 that mesh with each other. The drive pinion 221 rotates together with the propeller shaft 2. The ring gear 222 is fixed to the rear differential case 217.

The torque coupling 100 includes a tubular housing 101, an inner shaft 102, a multiple-disc clutch 103, an electromagnetic coil 104, and a cam mechanism 105. The housing 101 is connected to the side gear 214L of the rear differential 207 so as to be non-rotatable relative to the side gear 214L. The inner shaft 102 is connected to the axle shaft 213L so as to be non-rotatable relative to the axle shaft 213L. The multiple-disc clutch 103 is disposed between the housing 101 and the inner shaft 102. Currents are supplied to the electromagnetic coil 104 from the ECU 10. The cam mechanism 105 is operated by magnetic force generated by the electromagnetic coil 104 to press the multiple-disc clutch 103 on the basis of the relative rotation between the housing 101 and the inner shaft 102. In the torque coupling 100, the cam mechanism 105 presses the multiple-disc clutch 103 with cam thrust force based on the amount of currents supplied to the electromagnetic coil 104 to transmit the driving force between the housing 101 and the inner shaft 102.

For example, if the amount of currents supplied to electromagnetic coil 104 of the torque coupling 100 is set to zero in order to interrupt the transmission of the driving force from the side gear 214L to the axle shaft 213L, the transmission of the driving force from the propeller shaft 2 to the axle shaft 213R is interrupted due to idle running of the side gears 214R, 214L and the pinion gears 215. In other words, the torque coupling 100 is an example of an interrupting device in the invention, which is able to interrupt the transmission of the driving force from the propeller shaft 2 to the rear wheels 205R, 205L.

Figure 2:
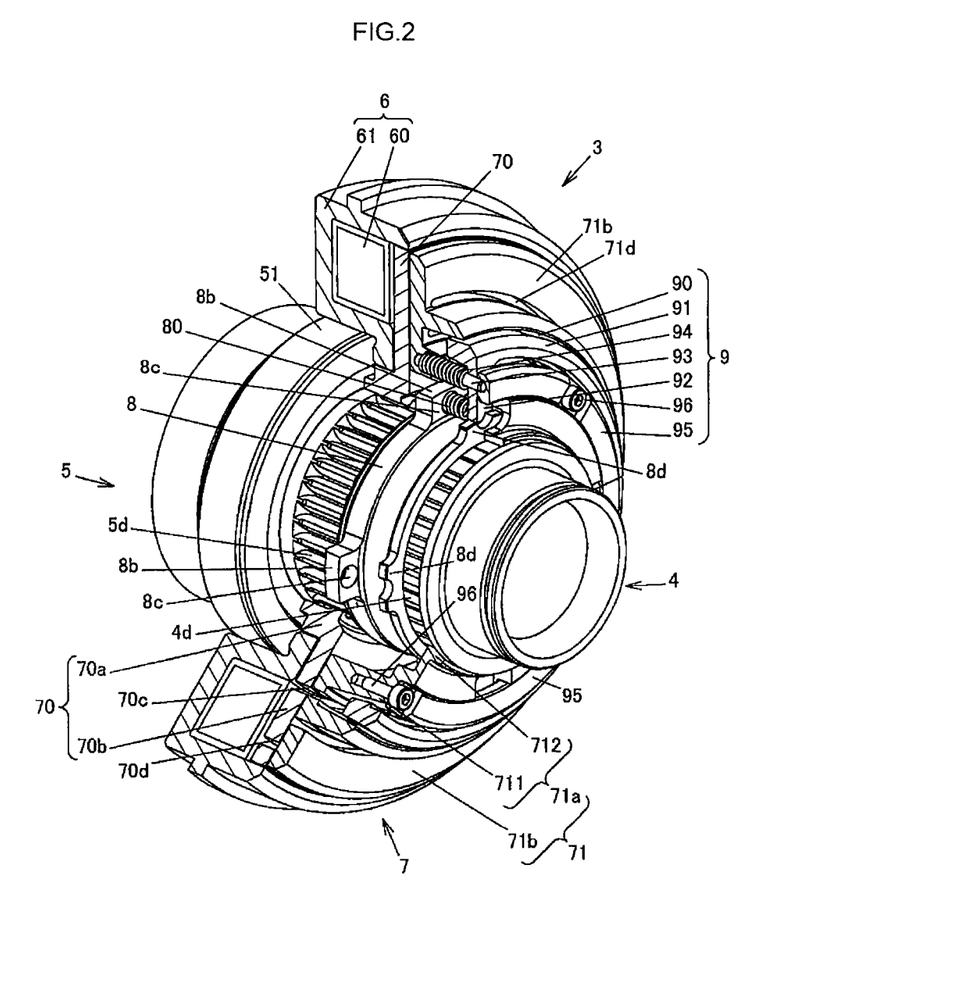
FIG. 2 is a perspective view illustrating the entire configuration of the electromagnetic clutch unit.
Figure 3:
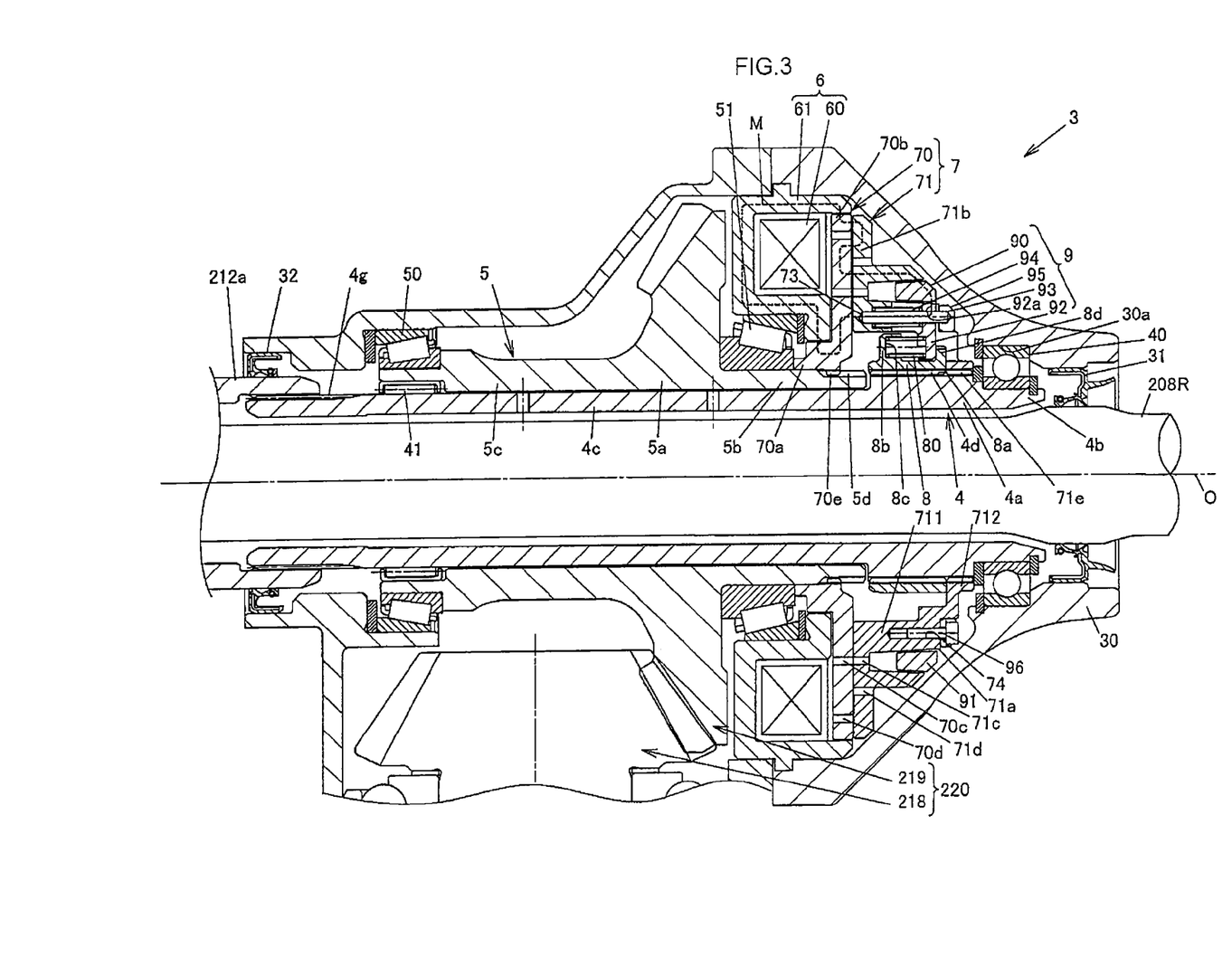
FIG. 3 is a sectional view illustrating the entire configuration of the electromagnetic clutch unit.
Figure 4A:
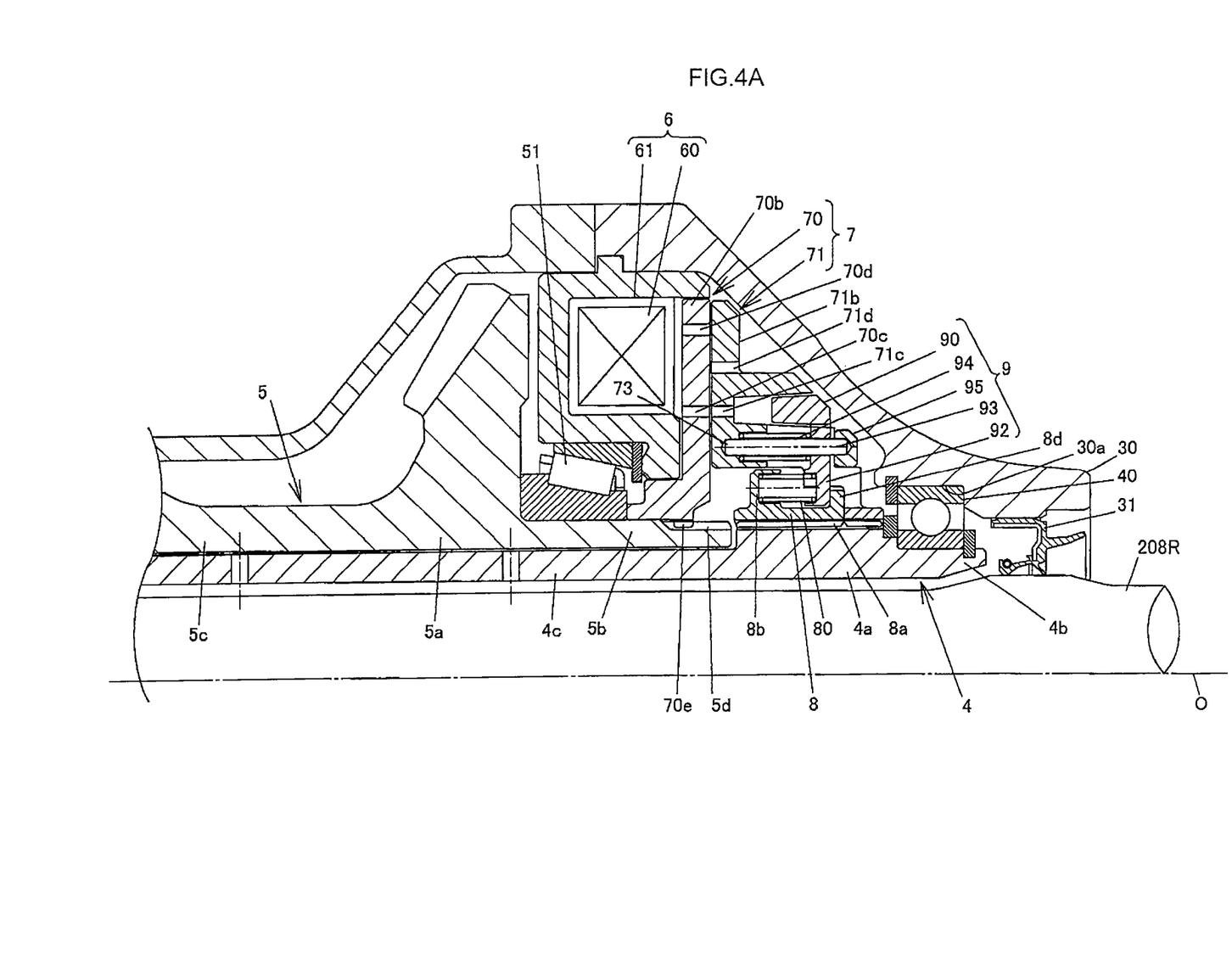
FIG. 4A is a sectional view illustrating main portions of the electromagnetic clutch unit when the electromagnetic clutch unit is in a non-operating state.
Figure 4B:
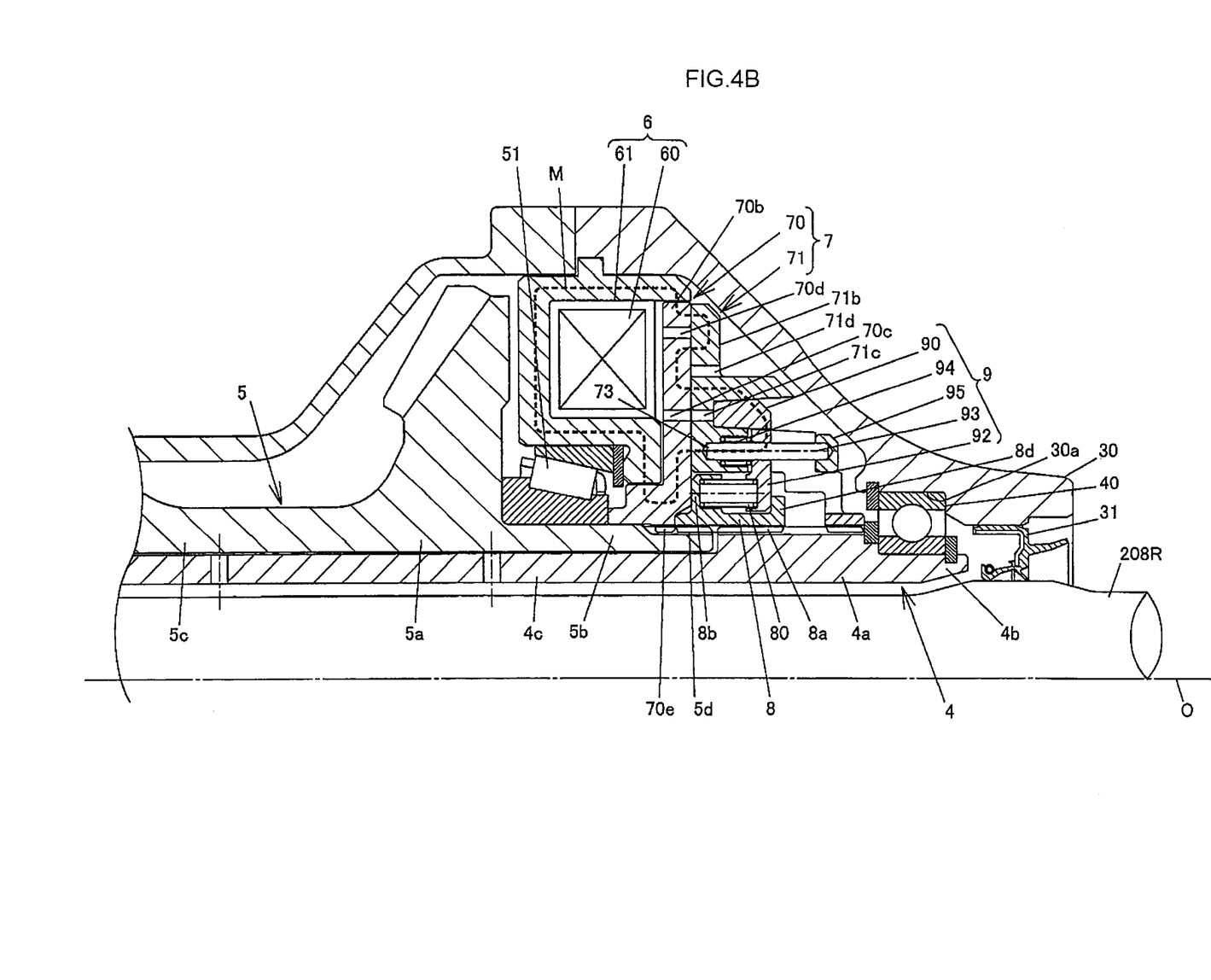
FIG. 4B is a sectional view illustrating the main portions of the electromagnetic clutch unit when the electromagnetic clutch unit is in an operating state.

FIG. 2 is a perspective view illustrating the entire configuration of the electromagnetic clutch unit 3. FIG. 3 is a sectional view illustrating the entire configuration of the electromagnetic clutch unit 3. FIG. 4A and FIG. 4B are sectional views each illustrating main portions of the electromagnetic clutch unit 3. FIG. 4A is a sectional view illustrating the main portions of the electromagnetic clutch unit 3 when the electromagnetic clutch unit 3 is in a non-operating state (a state in which torque transmission is interrupted). FIG. 4B is a sectional view illustrating the main portions of the electromagnetic clutch unit 3 when the electromagnetic clutch unit 3 is in an operating state.

The electromagnetic clutch unit 3 includes an input shaft member 4, the output shaft member 5, an electromagnetic coil 6, a friction mechanism 7, a lock sleeve 8, and a pressing mechanism 9. The driving force generated by the engine 202 is input into the input shaft member 4 from the front differential case 212. The driving force input into the input shaft member 4 is output from the output shaft member 5 toward the propeller shaft 2. The electromagnetic coil 6 is energized to generate electromagnetic force. The friction mechanism 7 is operated by the electromagnetic force generated by the electromagnetic coil 6. The lock sleeve 8 connects the input shaft member 4 and the output shaft member 5 such that the input shaft member 4 and the output shaft member 5 are non-rotatable relative to each other. The pressing mechanism 9 presses the lock sleeve 8.

The input shaft member 4 and the output shaft member 5 share a rotation axis O, and are rotatable relative to each other on the rotation axis O. The output shaft member 5 is an example of a first rotary member in the invention. The input shaft member 4 is an example of a second rotary member in the invention. In the electromagnetic clutch unit 3, the input shaft member 4 and the output shaft member 5 are connected to each other such that torque is transmitted therebetween.

The input shaft member 4 is an open-end cylindrical member that opens toward both sides in its axial direction and that has a first to a third cylindrical portions 4a to 4c that differ from each other in outside diameter. The first cylindrical portion 4a is formed to have a diameter that is larger than those of the second cylindrical portion 4b and the third cylindrical portion 4c. The second cylindrical portion 4b and the third cylindrical portion 4c are formed at the opposite end portions of the input shaft member 4 with the first cylindrical portion 4a interposed therebetween. The second cylindrical portion 4b is located on the right front wheel 204R side. The third cylindrical portion 4c is located on the front differential case 212 side. The second cylindrical portion 4b is supported by a ball bearing 40 disposed between the second cylindrical portion 4b and a unit case 30 for the electromagnetic clutch unit 3.

The front wheel-side axle shaft 208R is passed through the input shaft member 4. The input shaft member 4 is connected, at its third cylindrical portion 4c-side end, to the tubular portion 212a formed on the front differential case 212 of the front differential 206 so as to be non-rotatable relative to the tubular portion 212a. The third cylindrical portion 4c of the input shaft member 4 is supported by the inner peripheral face of the output shaft member 5 via a needle roller bearing 41. The input shaft member 4 rotates about the rotation axis O upon reception of the driving torque generated by the engine 202 from the front differential case 212.

A sealing mechanism 31 is fitted to an inner face 30a of the unit case 30. The sealing mechanism 31 is interposed between one axial side end portion (right front wheel 204R side end portion) of the inner face 30a and the outer peripheral face of the front wheel-side axle shaft 208R. In addition, a sealing mechanism 32 is fitted to the inner face 30a of the unit case 30. The sealing mechanism 32 is interposed between the other axial side end portion (front differential case 212 side end portion) of the inner face 30a and the outer peripheral face of the tubular portion 212a of the front differential case 212. A non-magnetic material, such as aluminum (Al), is used as the material of the unit case 30.

A straight spline fitting portion 4d exposed in the unit case 30 is formed on the outer peripheral face of the first cylindrical portion 4a. Further, a straight spline fitting portion 4g, which is spline-fitted to the inner face of the tubular portion 212a of the front differential case 212, is formed on the outer peripheral face of the third cylindrical portion 4c.

The output shaft member 5 is an open-end cylindrical member that opens toward both sides in its axial direction and that has a first to a third cylindrical portions 5a to 5c that differ from each other in outside diameter. The output shaft member 5 is rotatably housed in the unit case 30 of the electromagnetic clutch unit 3. The first cylindrical portion 5a is formed to have a diameter that is larger than those of the second cylindrical portion 5b and the third cylindrical portion 5c. The second cylindrical portion 5b and the third cylindrical portion 5c are formed at the opposite end portions of the output shaft member 5 with the first cylindrical portion 5a interposed therebetween. The second cylindrical portion 5b is located on the right front wheel 204R side. The third cylindrical portion 5c is located on the front differential case 212 side. The ring gear 219 of the front wheel-side gear mechanism 220 is disposed on the outer periphery of the first cylindrical portion 5a. Thus, the output shaft member 5 is connected to the propeller shaft 2 by the front wheel-side gear mechanism 220.

The third cylindrical portion 5c of the output shaft member 5 is supported by a tapered roller bearing 50 disposed between the third cylindrical portion 5c and the unit case 30 of the electromagnetic clutch unit 3. The second cylindrical portion 5b of the output shaft member 5 is supported by a tapered roller bearing 51 disposed between the second cylindrical portion 5b and a holder 61 of the electromagnetic coil 6. The output shaft member 5 is connected to the input shaft member 4 by the lock sleeve 8 (described later), thereby to receive the driving force from the input shaft member 4, and outputs the driving force to the propeller shaft 2 via the ring gear 219.

A straight spline fitting portion 5d is formed on the outer peripheral face of the second cylindrical portion 5b. The straight spline fitting portion 5d includes positions at which the straight spline fitting portion 5d is connected to a first friction member 70 (described later) of the friction mechanism 7 and the lock sleeve 8. The tapered roller bearing 51 is provided on the outer peripheral face of the second cylindrical portion 5b, at a position between the second cylindrical portion 5b and the holder 61 of the electromagnetic coil 6.

The electromagnetic coil 6 includes an annular coil 60, and an annular holder 61 that houses the coil 60 and that has a U-shaped section with angled corners or a U-shaped section with rounded corners. The holder 61 is supported by the unit case 30 when its outer peripheral face is in contact with the inner face 30a of the unit case 30. The holder 61 is made of a magnetic material, such as a ferrous metal, and has a stiffness that is higher than that of the unit case 30. In other words, the output shaft member 5 is supported via the tapered roller bearing 51 by the holder 61 that has a stiffness higher than that of the unit case 30, and therefore a high support stiffness is achieved.

The holder 61 opens toward the friction mechanism 7 (described later), and the coil 60 is inserted through the opening into the housing space within the holder 61. The electromagnetic coil 6 forms a magnetic path M over the holder 61 and the friction mechanism 7 upon energization of the coil 60, which is controlled by the ECU 10, thus generating electromagnetic force for actuating the friction mechanism 7.

The friction mechanism 7 is opposed to the opening of the holder 61, and is disposed around the outer periphery of the first cylindrical portion 4a of the input shaft member 4 and the outer periphery of the second cylindrical portion 5b of the output shaft member 5. The friction mechanism 7 has the first friction member 70 and a second friction member 71. The first friction member 70 is connected to the output shaft member 5 so as to be non-rotatable relative to the output shaft member 5. The second friction member 71 is connected to the input shaft member 4 so as to be non-rotatable relative to the input shaft member 4, and can be frictionally engaged with the first friction member 70 by the electromagnetic force generated by the electromagnetic coil 6.

The first friction member 70 is made of a magnetic material, such as a ferrous metal. The first friction member 70 is an annular member fitted onto the second cylindrical portion 5b of the output shaft member 5 and located at one axial side (the electromagnetic coil 6 side) portion of the friction mechanism 7. The first friction member 70 is formed of a base portion 70a and a frictionally engaged portion 70b located radially outward of the base portion 70a. The frictionally engaged portion 70b extends radially outward from the outer periphery of the base portion 70a.

The frictionally engaged portion 70b has a disc-shape and split into three sections by an inner slit 70c and an outer slit 70d that are formed so as to be concentric with each other. Each of the inner slit 70c and the outer slit 70d is formed of a plurality of arc-shaped slits to suppress occurrence of a short-circuit of a magnetic flux in the radial direction in the frictionally engaged portion 7b.

A straight spline fitting portion 70e is formed on the inner peripheral face of the base portion 70a. The straight spline fitting portion 70e is spline-fitted to the straight spline fitting portion 5d of the output shaft member 5. When the straight spline fitting portion 70e is spline-fitted to the straight spline fitting portion 5d, the first friction member 70 is connected to the output shaft member 5 so as to be non-rotatable relative to the output shaft member 5 but movable in the axial direction. When the straight spline fitting portion 70e is brought into contact with the electromagnetic coil 6-side end of the straight spline fitting portion 5d, the movement of the first friction member 70 in the axial direction toward the electromagnetic coil 6 is restricted.

Figure 5A:
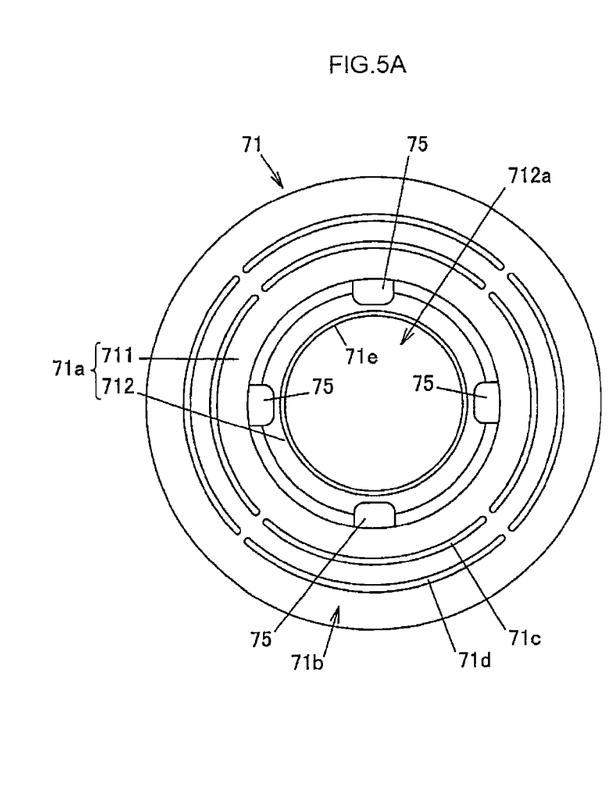
FIG. 5A is a front view of a second friction member.
Figures 5B, 5C, 5D:
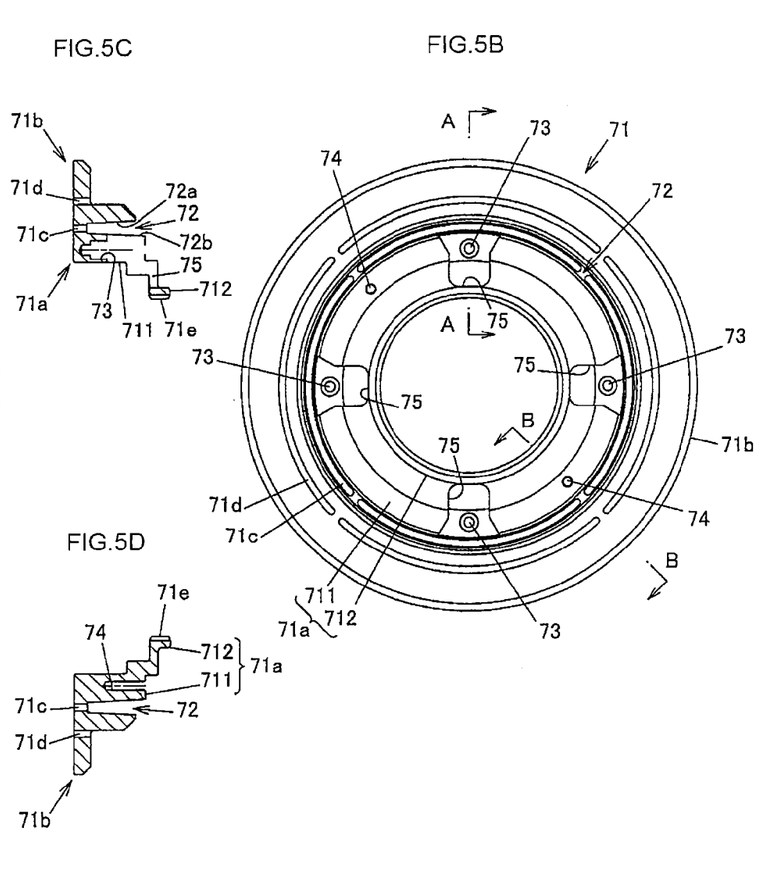
FIG. 5B is a back view of the second friction member.
FIG. 5C is a sectional view of the second friction member taken along the line A-A in FIG. 5B.
FIG. 5D is a sectional view of the second friction member taken along the line B-B in FIG. 5B.

FIG. 5A is a front view of the second friction member 71. FIG. 5B is a back view of the second friction member 71. FIG. 5C is a sectional view of the second friction member 71 taken along the line A-A in FIG. 5B. FIG. 5D is a sectional view of the second friction member 71 taken along the line B-B in FIG. 5B.

The second friction member 71 is made of a magnetic material, such as a ferrous metal. The second friction member 71 is disposed at such a position that the first friction member 70 is held between the second friction member 71 and the electromagnetic coil 6. The second friction member 71 has a base portion 71a and a frictionally engaged portion 71b located radially outward of the base portion 71a. The frictionally engaged portion 71b is opposed to the first friction member 70.

The base portion 71a is a cylindrical portion that has a large-diameter portion 711 and a small-diameter portion 712. The small-diameter portion 712 has, at its center, an insertion hole 712a through which the input shaft member 4 is passed. A straight spline fitting portion 71e is formed on the inner peripheral face of the base portion 71a, which defines the insertion hole 712a. The straight spline fitting portion 71e is spline-fitted to the straight spline fitting portion 4d of the input shaft member 4. When the straight spline fitting portion 71e is spline-fitted to the straight spline fitting portion 4d of the input shaft member 4, which is passed through the insertion hole 712a, the second friction member 71 is connected to the input shaft member 4 so as to be non-rotatable relative to the input shaft member 4 but movable in the axial direction.

As illustrated in FIG. 5B, the large-diameter portion 711 of the base portion 71a has four recessed holes 73, which open at its axial end face (the right front wheel 204R-side end face), which are located at equal intervals in the circumferential direction, and which are parallel to the rotation axis O. The large-diameter portion 711 has two threaded holes 74, which are located at positions different from the recessed holes 73, in its axial end face. The threaded holes 74 are used to fix an annular retaining member 95 to the large-diameter portion 711 with screws 96. The annular retaining member 95 restricts the movement of a pressing member 90 (described later). Further, the large-diameter portion 711 has four generally rectangular through-holes 75 that are located radially inward of the recessed holes 73 and that pass through the second friction member 71 in the thickness direction that is parallel to the rotation axis O.

The frictionally engaged portion 71b is a circular disc-shaped portion formed integrally with the base portion 71a, and split into three sections by an inner slit 71c and an outer slit 71d that are formed so as to be concentric with each other. Each of the inner slit 71c and the outer slit 71d is formed of multiple (four) arc-shaped slits.

An annular recessed portion 72, which opens at the opposite side of the second friction member 72 from the first friction member 70, is formed in the second friction member 71. The bottom portion of the recessed portion 72 in its depth direction, which is parallel to the rotation axis O, is in communication with the inner slit 71c. The second friction member 71 is formed such that the distance between a radially outer-side inner face 72a of the recessed portion 72 and a radially inner-side inner face 72b of the recessed portion 72 gradually increases as the distance from the bottom of the recessed portion 72 increases.

The frictionally engaged portion 71b of the second friction member 71 is moved so as to be frictionally engaged with the frictionally engaged portion 70b of the first friction member 70 by the electromagnetic force generated by the electromagnetic coil 6. The magnetic path M is formed between the second friction member 71 and the first friction member 70.

Figure 6A:
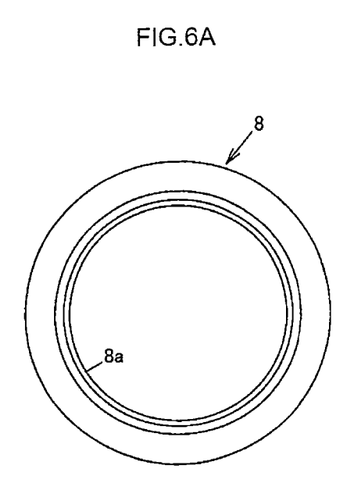
FIG. 6A is a front view of a lock sleeve.
Figure 6B:
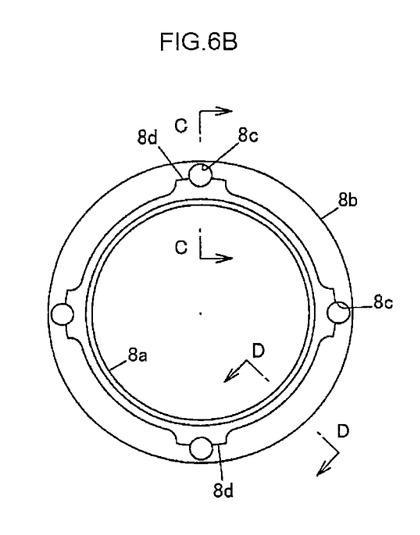
FIG. 6B is a back view of the lock sleeve.
Figure 6C:
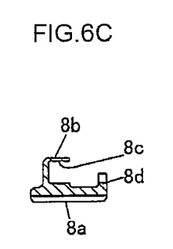
FIG. 6C is a sectional view of the lock sleeve taken along the line C-C in FIG. 6B.
Figure 6D:
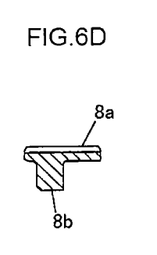
FIG. 6D is a sectional view of the lock sleeve taken along the line D-D in FIG. 6B.

FIG. 6A is a front view of the lock sleeve 8. FIG. 6B is a back view of the lock sleeve 8. FIG. 6C is a sectional view of the lock sleeve 8 taken along the line C-C in FIG. 6B. FIG. 6D is a sectional view of the lock sleeve 8 taken along the line D-D in FIG. 6B.

The lock sleeve 8 is a tubular member having a straight spline fitting portion 8a on its inner peripheral face and is housed radially inward of the large-diameter portion 711 of the second friction member 71 so as to be movable in the axial direction. When the straight spline fitting portion 8a is spline-fitted to the straight spline fitting portion 4d of the input shaft member 4, the lock sleeve 8 is connected to the input shaft member 4 so as to be non-rotatable relative to the input shaft member 4.

When the lock sleeve 8 moves in the axial direction toward the first friction member 70, the lock sleeve 8 is spline-fitted also to the straight spline fitting portion 5d of the output shaft member 5. More specifically, the lock sleeve 8 is movable in the axial direction between a first position at which the straight spline fitting portion 8a is engaged with only the input shaft member 4 and a second position at which the straight spline fitting portion 8a is engaged with both the input shaft member 4 and the output shaft member 5. When the lock sleeve 8 moves to the second position, the input shaft member 4 and the output shaft member 5 are connected to each other so as to be non-rotatable relative to each other.

A rib 8b that extends radially outward is formed on the outer peripheral face of the lock sleeve 8. The rib 8b is formed so as to be continuous along the entire circumference of the lock sleeve 8. The rib 8b is located at one axial end portion of the lock sleeve 8. The face of the rib 8b, which is opposed to the pressing member 90, has four recessed holes 8c that are located at equal intervals in the circumferential direction. Four supporting portions 8d opposed to the rib 8b are formed at the other axial end portion of the lock sleeve 8. First springs 80, which serve as pressing elastic members, are disposed between the bottom faces of the recessed holes 8c and recessed holes 92b (described later) of the pressing member 90. As the first springs 80, for example, a compression coil spring is used. When the electromagnetic clutch unit 3 is not operating, the supporting portions 8d receive the elastic forces of the first springs 80 via the pressing member 90 to restrict the movement of the pressing member 90 in the axial direction relative to the lock sleeve 8.

The first springs 80 are interposed between the pressing member 90 and the rib 8b of the lock sleeve 8, and are compressively deformed as the pressing member 90 moves toward the first friction member 70. The lock sleeve 8 receives, from the first springs 80, urging force with which the lock sleeve 8 moves from the first position to the second position. More specifically, the pressing member 90 presses the lock sleeve 8 using the electromagnetic force generated by the electromagnetic coil 6 so as to move the lock sleeve 8 from the first position to the second position.

Figure 7A:
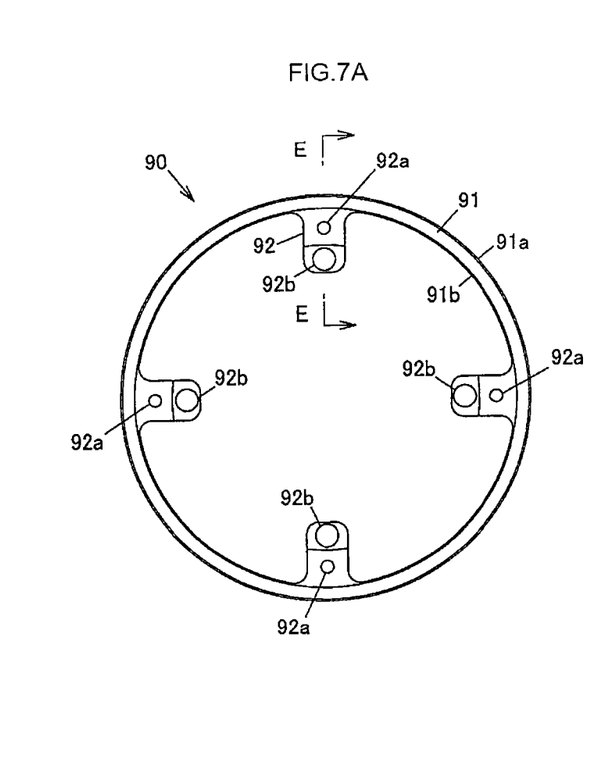
FIG. 7A is a front view of a pressing member.
Figures 7B, 7C:
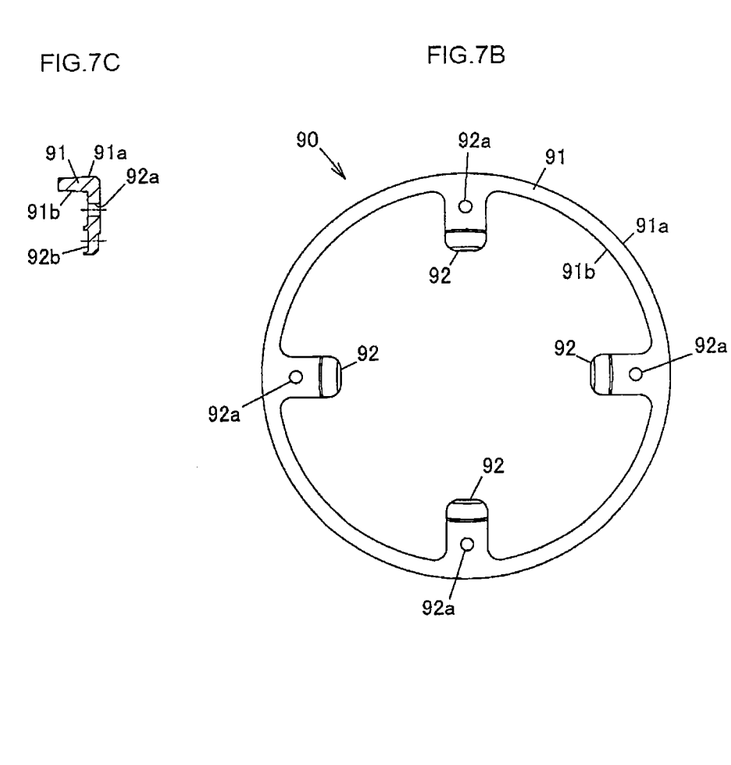
FIG. 7B is a back view of the pressing member.
FIG. 7C is a sectional view of the pressing member taken along the line E-E in FIG. 7A.

FIG. 7A is a front view of the pressing member 90. FIG. 7B is a back view of the pressing member 90. FIG. 7C is a sectional view of the pressing member 90 taken along the line E-E in FIG. 7A. The pressing mechanism 9 includes the pressing member 90, pins 93, second springs 94, which serve as elastic members fitted onto the pins 93, and the annular retaining member 95.

The pressing member 90 is a single-piece member having a tubular portion 91 and projections 92 that project from the tubular portion 91 radially inward. The projections 92 are provided at four positions located at equal intervals in the circumferential direction of the tubular portion 91. The tubular portion 91 is formed in a wedge shape in a section parallel to the rotation axis O, such that the radial thickness of the tubular portion 91 gradually decreases from one axial end thereof where the projections 92 are formed toward the other axial end thereof.

As illustrated in FIG. 3 and FIG. 4A and FIG. 4B, the tubular portion 91 is at least partially housed in the recessed portion 72 of the second friction member 71. The projections 92 are housed in the through-holes 75 formed in the second friction member 71 (refer to FIG. 5) and prevented from slipping out of the through-holes 75 by the retaining member 95.

An outer peripheral face 91a of the tubular portion 91 is opposed to the radially outer-side inner face 72a of the recessed portion 72, whereas an inner peripheral face 91b of the tubular portion 91 is opposed to the radially inner-side inner face 72b of the recessed portion 72. The magnetic path M is formed between the inner faces 72a, 72b of the recessed portion 72 and the outer peripheral face 91a and the inner peripheral face 91b of the tubular portion 91. The tubular portion 91 receives force that attracts the tubular portion 91 toward the bottom of the recessed portion 72 due to a magnetic flux passing through the magnetic path M.

An insertion hole 92a, through which the pin 93 is passed, is formed in a root side portion (in the tubular portion 91-side portion) of each of the projections 92, and the recessed hole 92b that supports one end of the first springs 80 illustrated in FIG. 3 and FIG. 4 is formed in a distal end side portion of each of the projections 92. As the material of the pressing member 90, a magnetic material, such as a ferrous metal, is used.

Each of the pins 93 is formed of a rod-like member that is fixedly fitted at one end in a corresponding one of the recessed holes 73 of the second friction member 71 and that is fixedly fitted at the other end in the annular retaining member 95. In the present embodiment, the number of the pins 93 is four. The pins 93 are made of a magnetic material, such as a ferrous metal. The pins 93 are passed through the insertion holes 92a of the projections 92 of the pressing member 90. Thus, the pressing member 90 is connected to the second friction member 71 so as to be non-rotatable relative to the second friction member 71 but movable along the pins 93 in the axial direction.

The second springs 94 are fitted onto the pins 93 and interposed between the second friction member 71 and the pressing member 90. The second springs 94 are compressed as the pressing member 90 moves toward the electromagnetic coil 6 due to an increase in the electromagnetic force generated by the electromagnetic coil 6. The urging force produced by the compressive deformation acts so as to press the second friction member 71 against the first friction member 70. On the other hand, when the energization of the electromagnetic coil 6 is stopped and the electromagnetic force disappears, the second springs 94 functions as return springs that make the pressing member 90 move away from the second friction member 71 using its urging force.

Next, the operation of the electromagnetic clutch unit 3 will be described. The case where the four-wheel-drive vehicle 200 is switched from the two-wheel-drive mode to the four-wheel-drive mode will be mainly described below.

When the four-wheel-drive vehicle 200 is travelling in the two-wheel-drive mode, transmission of the driving force by the electromagnetic clutch unit 3 and the transmission of the driving force by the torque coupling 100 are both interrupted and the rotation of the propeller shaft 2 is stopped.

In order to switch the four-wheel-drive vehicle 200 from the two-wheel-drive mode to the four-wheel-drive mode, currents are supplied from the ECU 10 to the electromagnetic coil 6 of the electromagnetic clutch unit 3. Thus, a magnetic flux is generated in the magnetic path M, and the second friction member 71 moves toward the first friction member 70 by the electromagnetic force generated by the electromagnetic coil 6. In accordance with this movement, the frictionally engaged portion 71b of the second friction member 71 frictionally slides on the frictionally engaged portion 70b of the first friction member 70. Due to the frictional force generated by the frictional sliding, part of the driving force input into the input shaft member 4 from the front differential case 212 is transmitted to the output shaft member 5 via the first friction member 70 and the second friction member 71. The driving force transmitted to the output shaft member 5 is transmitted to the propeller shaft 2 via the front wheel-side bevel gear mechanism 220, thus rotating the propeller shaft 2.

Meanwhile, the electromagnetic force generated by the electromagnetic coil 6 acts so as to draw the tubular portion 91 of the pressing member 90 toward the bottom of the recessed portion 72 of the second friction member 71. In accordance with this action, the pressing member 90 moves toward the second friction member 71 against restoring force of the second springs 94 disposed between the pressing member 90 and the large-diameter portion 711 of the second friction member 71. Due to the movement of the pressing member 90, the second springs 94 is compressively deformed. The urging force resulting from the compressive deformation of the second springs 94 acts so as to press the second friction member 71 against the first friction member 70. Thus, the second friction member 71 is pressed more strongly against the first friction member 70.

Due to the movement of the pressing member 90, the first springs 80, which are interposed between the pressing member 90 and the rib 8b of the lock sleeve 8, are compressively deformed. As the first springs 80 are compressively deformed, the lock sleeve 8 receives, from the first springs 80, urging force with which the lock sleeve 8 is moved from the first position, at which the straight spline fitting portion 8a is engaged with only the straight spline fitting portion 4d of the input shaft member 4, to the second position, at which the straight spline fitting portion 8a is engaged with both the straight spline fitting portion 4d of the input shaft member 4 and the straight spline fitting portion 5d of the output shaft member 5.

In the state where the rotation of the input shaft member 4 and the rotation of the output shaft member 5 are not synchronized with each other, the lock sleeve 8 is not able to move to the second position due to the contact between the straight spline fitting portion 8a of the lock sleeve 8 and the straight spline fitting portion 5d of the output shaft member 5. However, when the rotational speeds of the output shaft member 5 and the propeller shaft 2 are increased by the driving force transmitted to the output shaft member 5 via the first friction member 70 and the second friction member 71 and thus the rotation of the input shaft member 4 and the rotation of the output shaft member 5 are synchronized with each other, the lock sleeve 8 is moved to the second position by the urging force of the first springs 80. Thus, the input shaft member 4 and the output shaft member 5 are connected so as to be non-rotatable relative to each other by the lock sleeve 8.

After the input shaft member 4 and the output shaft member 5 are connected to each other by the lock sleeve 8, the magnetic resistance of the magnetic path M extending over the holder 61, the friction mechanism 7, and the pressing member 90 decreases. Further, because the urging force applied to the pressing member 90 by the first springs 80 decreases, the input shaft member 4 and the output shaft member 5 are kept connected to each other by supplying, to the electromagnetic coil 6, a current required to hold the lock sleeve 8 at the second position. This makes it possible to make the current that is supplied to the electromagnetic coil 6 smaller than that in the case where the rotational speeds of the output shaft member 5 and the propeller shaft 2 are increased by the force of friction between the first friction member 70 and the second friction member 71.

In other words, the value of the current applied to the electromagnetic coil 6 to hold the lock sleeve 8 at the second position is smaller than the maximum value of the current applied to the electromagnetic coil 6 to move the lock sleeve 8 from the first position to the second position. In this case, if the current that is applied to the electromagnetic coil 6 is pulse current, the maximum value of the current value signifies a mean current value in a state where the duty ratio, which is the ratio of the time during which the current is applied to the time during which the current is not applied, is the largest.

In the state where the input shaft member 4 and the output shaft member 5 are connected to each other by the lock sleeve 8, the driving force that is transmitted to the rear wheels 205R, 205L is adjusted by increasing or decreasing the current that is supplied from the ECU 10 to the electromagnetic coil 104 of the torque coupling 100.

In order to cancel the four-wheel-drive mode to switch the four-wheel-drive vehicle 200 to the two-wheel-drive mode, the supply of the current to the electromagnetic coil 6 is interrupted. Thus, the electromagnetic force is no longer generated by the electromagnetic coil 6, and the pressing member 90 is moved away from the second friction member 71 in the axial direction by the restoring force of the second springs 94. In accordance with this, the lock sleeve 8 moves from the second position to the first position, and the input shaft member 4 and the output shaft member 5 are disconnected from each other.

The present embodiment described above produces the following advantageous effects.

(1) When the drive mode is switched from the two-wheel-drive mode to the four-wheel-drive mode, the rotational speeds of the output shaft member 5 and the propeller shaft 2 are increased by the driving force transmitted from the input shaft member 4 to the friction mechanism 7. Thus, it is possible to synchronize the rotation of the input shaft member 4 and the rotation of the output shaft member 5 with each other even if there is a difference in rotational speed between the front wheels 204R, 204L and the rear wheels 205R, 205L. Therefore, even if the need for switching the drive mode from the two-wheel-drive mode to the four-wheel-drive mode arises, for example, when the four-wheel-drive vehicle 200 is making a turn on a low μ road (road with a low friction), it is possible to synchronize the rotation of the input shaft member 4 and the rotation of the output shaft member 5 with each other with the use of the friction mechanism 7, and to connect the input shaft member 4 and the output shaft member 5 to each other with the use of the lock sleeve 8.

(2) The tubular portion 91 of the pressing member 90 is drawn toward the bottom of the recessed portion 72 of the second friction member 71 by the electromagnetic force generated by the electromagnetic coil 6, and the second friction member 71 is pressed against the first friction member 70 by the urging force resulting from the compressive deformation of the second springs 94. Accordingly, the second friction member 71 is pressed more strongly against the first friction member 70, and therefore the force of friction between the first friction member 70 and the second friction member 71 increases. This makes it possible to more promptly synchronize the rotation of the input shaft member 4 and the rotation of the output shaft member 5 with each other, thereby making it possible to switch the drive mode to the four-wheel-drive mode more promptly.

(3) The lock sleeve 8 is elastically pressed toward the second position by the urging force of the first springs 80. Thus, the lock sleeve 8 is automatically moved to the second position when the rotation of the input shaft member 4 and the rotation of the output shaft member 5 are synchronized with each other. In other words, there is no need to move the lock sleeve 8 by an actuator, such as a solenoid, after the rotation of the input shaft member 4 and the rotation of the output shaft member 5 are synchronized with each other. As a result, it is possible to simplify the configuration of the electromagnetic clutch unit 3, thereby achieving reductions in size, weight and cost of the electromagnetic clutch unit.

The electromagnetic clutch unit according to the invention and the four-wheel-drive vehicle including the electromagnetic clutch unit have been described with reference to the foregoing embodiment. However, the invention is not limited to the foregoing embodiment and may be implemented in various other embodiments within the scope of the invention.

In the foregoing embodiment, the invention is applied to the four-wheel-drive vehicle 200 in which the front wheels 204R, 204L are the main drive wheels and the rear wheels 205R, 205L are auxiliary drive wheels. However, the vehicle to which the invention is applied is not limited to the four-wheel-drive vehicle 200, and the invention may be applied to a four-wheel-drive vehicle in which the front wheels are auxiliary wheels and the rear wheels are main drive wheels. In the foregoing embodiment, the first friction member 70 is connected to the output shaft member 5 and the second friction member 71 is connected to the input shaft member 4. Alternatively, the first friction member 70 may be connected to the input shaft member 4 and the second friction member 71 may be connected to the output shaft member 5.

According to the invention, even if the rotations of the first rotary member and the second rotary member, which are to be connected to each other such that driving force is transmitted therebetween, are not synchronized with each other, it is possible to synchronize the rotations of the two rotary members with each other, thereby connecting the two rotary members to each other through engagement.

What is claimed is:

1. An electromagnetic clutch unit configured to connect a first rotary member and a second rotary member, which are rotatable relative to each other, such that torque is transmitted between the first rotary member and the second rotary member, the electromagnetic clutch unit comprising:
   an electromagnetic coil that generates electromagnetic force upon energization of the electromagnetic coil;
   a friction mechanism including a first friction member connected to the first rotary member so as to be non-rotatable relative to the first rotary member, and a second friction member connected to the second rotary member so as to be non-rotatable relative to the second rotary member and frictionally engageable with the first friction member by the electromagnetic force;
   a lock sleeve connected to the second rotary member so as to be non-rotatable relative to the second rotary member, and movable in an axial direction of the electromagnetic clutch unit between a first position at which the lock sleeve is engaged with the second rotary member but is not engaged with the first rotary member and a second position at which the lock sleeve is engaged with both the first rotary member and the second rotary member; and
   a single-piece pressing member that is axially movable relative to the second friction member and that constitutes a magnetic path extending over the pressing member and the second friction member, and that presses the lock sleeve with the electromagnetic force to move the lock sleeve from the first position to the second position.

2. The electromagnetic clutch unit according to claim 1, further comprising:
   an elastic member interposed between the pressing member and the second friction member,
   wherein urging force resulting from compressive deformation of the elastic member caused by a movement of the pressing member acts so as to press the second friction member against the first friction member.

3. The electromagnetic clutch unit according to claim 2, further comprising:
   a pressing elastic member that is interposed between the pressing member and the lock sleeve and that is compressively deformed by a movement of the pressing member toward the first rotary member,
   wherein the lock sleeve receives, from the pressing elastic member, urging force with which the lock sleeve moves from the first position to the second position.

4. The electromagnetic clutch unit according to claim 2, wherein:
   an annular recessed portion that opens at an opposite side of the second friction member from the first friction member is formed in the second friction member;
   the pressing member has a tubular portion that is at least partially housed in the recessed portion; and
   the magnetic path is formed between an inner face of the recessed portion and an outer face of the tubular portion.

5. A four-wheel-drive vehicle comprising:
   the electromagnetic clutch unit according to claim 2;
   a pair of right and left main drive wheels to which driving force generated by a drive source is constantly transmitted;
   a main drive wheel-side differential unit that includes a pair of side gears connected respectively to the right and left main drive wheels, and a differential case that houses the side gears;
   a pair of right and left auxiliary drive wheels to which the driving force generated by the drive source is transmitted depending on a travelling state of the vehicle;
   an auxiliary drive wheel-side differential unit that includes a pair of side gears connected respectively to the right and left auxiliary drive wheels, and a differential case that houses the side gears; and
   a driving force transmission shaft that transmits the driving force from the main drive wheel side toward the auxiliary drive wheels,
   wherein one rotary member out of the first rotary member and the second rotary member is connected to the differential case of the main drive wheel-side differential unit, and the other rotary member out of the first rotary member and the second rotary member is connected to the driving force transmission shaft.

6. The four-wheel-drive vehicle according to claim 5, further comprising:
   an interrupting device that is able to interrupt transmission of the driving force from the driving force transmission shaft to the auxiliary drive wheels.

7. A control method for the four-wheel-drive vehicle according to claim 5, wherein a value of a current for holding the lock sleeve at the second position is smaller than a maximum value of a current applied to the electromagnetic coil to move the lock sleeve from the first position to the second position.

8. A control method for the electromagnetic clutch unit according to claim 2, wherein a value of a current for holding the lock sleeve at the second position is smaller than a maximum value of a current applied to the electromagnetic coil to move the lock sleeve from the first position to the second position.

9. The electromagnetic clutch unit according to claim 1, further comprising:
   a pressing elastic member that is interposed between the pressing member and the lock sleeve and that is compressively deformed by a movement of the pressing member toward the first rotary member,
   wherein the lock sleeve receives, from the pressing elastic member, urging force with which the lock sleeve moves from the first position to the second position.

10. The electromagnetic clutch unit according to claim 9, wherein:

an annular recessed portion that opens at an opposite side of the second friction member from the first friction member is formed in the second friction member;

the pressing member has a tubular portion that is at least partially housed in the recessed portion; and the magnetic path is formed between an inner face of the recessed portion and an outer face of the tubular portion.

11. A four-wheel-drive vehicle comprising:

the electromagnetic clutch unit according to claim 9;

a pair of right and left main drive wheels to which driving force generated by a drive source is constantly transmitted;

a main drive wheel-side differential unit that includes a pair of side gears connected respectively to the right and left main drive wheels, and a differential case that houses the side gears;

a pair of right and left auxiliary drive wheels to which the driving force generated by the drive source is transmitted depending on a travelling state of the vehicle;

an auxiliary drive wheel-side differential unit that includes a pair of side gears connected respectively to the right and left auxiliary drive wheels, and a differential case that houses the side gears; and a driving force transmission shaft that transmits the driving force from the main drive wheel side toward the auxiliary drive wheels, wherein one rotary member out of the first rotary member and the second rotary member is connected to the differential case of the main drive wheel-side differential unit, and the other rotary member out of the first rotary member and the second rotary member is connected to the driving force transmission shaft.

12. The four-wheel-drive vehicle according to claim 11, further comprising:

an interrupting device that is able to interrupt transmission of the driving force from the driving force transmission shaft to the auxiliary drive wheels.

13. A control method for the electromagnetic clutch unit according to claim 9, wherein a value of a current for holding the lock sleeve at the second position is smaller than a maximum value of a current applied to the electromagnetic coil to move the lock sleeve from the first position to the second position.

14. The electromagnetic clutch unit according to claim 1, wherein:

an annular recessed portion that opens at an opposite side of the second friction member from the first friction member is formed in the second friction member;

the pressing member has a tubular portion that is at least partially housed in the recessed portion; and the magnetic path is formed between an inner face of the recessed portion and an outer face of the tubular portion.

15. A four-wheel-drive vehicle comprising:

the electromagnetic clutch unit according to claim 14;

a pair of right and left main drive wheels to which driving force generated by a drive source is constantly transmitted;

a main drive wheel-side differential unit that includes a pair of side gears connected respectively to the right and left main drive wheels, and a differential case that houses the side gears;

a pair of right and left auxiliary drive wheels to which the driving force generated by the drive source is transmitted depending on a travelling state of the vehicle;

an auxiliary drive wheel-side differential unit that includes a pair of side gears connected respectively to the right and left auxiliary drive wheels, and a differential case that houses the side gears; and a driving force transmission shaft that transmits the driving force from the main drive wheel side toward the auxiliary drive wheels, wherein one rotary member out of the first rotary member and the second rotary member is connected to the differential case of the main drive wheel-side differential unit, and the other rotary member out of the first rotary member and the second rotary member is connected to the driving force transmission shaft.

16. A four-wheel-drive vehicle comprising:

the electromagnetic clutch unit according to claim 1;

a pair of right and left main drive wheels to which driving force generated by a drive source is constantly transmitted;

a main drive wheel-side differential unit that includes a pair of side gears connected respectively to the right and left main drive wheels, and a differential case that houses the side gears;

a pair of right and left auxiliary drive wheels to which the driving force generated by the drive source is transmitted depending on a travelling state of the vehicle;

an auxiliary drive wheel-side differential unit that includes a pair of side gears connected respectively to the right and left auxiliary drive wheels, and a differential case that houses the side gears; and a driving force transmission shaft that transmits the driving force from the main drive wheel side toward the auxiliary drive wheels, wherein one rotary member out of the first rotary member and the second rotary member is connected to the differential case of the main drive wheel-side differential unit, and the other rotary member out of the first rotary member and the second rotary member is connected to the driving force transmission shaft.

17. The four-wheel-drive vehicle according to claim 16, further comprising:

an interrupting device that is able to interrupt transmission of the driving force from the driving force transmission shaft to the auxiliary drive wheels.

18. A control method for the four-wheel-drive vehicle according to claim 17, wherein a value of a current for holding the lock sleeve at the second position is smaller than a maximum value of a current applied to the electromagnetic coil to move the lock sleeve from the first position to the second position.

19. A control method for the four-wheel-drive vehicle according to claim 16, wherein a value of a current for holding the lock sleeve at the second position is smaller than a maximum value of a current applied to the electromagnetic coil to move the lock sleeve from the first position to the second position.

20. A control method for the electromagnetic clutch unit according to claim 1, wherein a value of a current for holding the lock sleeve at the second position is smaller than a maximum value of a current applied to the electromagnetic coil to move the lock sleeve from the first position to the second position.

* * * * *